(12) United States Patent
Ylitalo et al.

(10) Patent No.: US 9,179,318 B2
(45) Date of Patent: *Nov. 3, 2015

(54) DELEGATION BASED MOBILITY MANAGEMENT

(71) Applicant: TELEFONAKTIEBOLAGET L M ERICSSON (PUBL), Stockholm (SE)

(72) Inventors: Jukka Ylitalo, Espoo (FI); Jan Melén, Espoo (FI); Patrik Salmela, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 61 days.

This patent is subject to a terminal disclaimer.

(21) Appl. No.: 14/201,143

(22) Filed: Mar. 7, 2014

(65) Prior Publication Data

US 2014/0185807 A1    Jul. 3, 2014

Related U.S. Application Data

(63) Continuation of application No. 12/301,371, filed as application No. PCT/EP2006/062574 on May 24, 2006, now Pat. No. 8,705,439.

(51) Int. Cl.
*H04W 4/00* (2009.01)
*H04W 12/12* (2009.01)
*H04W 12/06* (2009.01)
(Continued)

(52) U.S. Cl.
CPC ............ *H04W 12/12* (2013.01); *H04W 12/06* (2013.01); *H04L 63/0823* (2013.01); *H04W 12/10* (2013.01)

(58) Field of Classification Search
CPC ................................ H04L 63/0823

USPC .......................................... 370/328
See application file for complete search history.

(56) References Cited

U.S. PATENT DOCUMENTS 6,976,164 B1    12/2005    King et al.
7,401,216 B2    7/2008    Arkko et al.
(Continued)

FOREIGN PATENT DOCUMENTS

GB    2 381 423 A    4/2003

OTHER PUBLICATIONS

Arkko, et al: "Security of Internet Location Management". In Proc. of the 18th Annual Computer Security Applications Conference, Las Vegas, USA. Dec. 2002.
(Continued)

*Primary Examiner* — Shripal Khajuria
*Assistant Examiner* — Farhad Ali (57) ABSTRACT

A method of handling mobility-related signalling in a communications system comprising a mobile node, a mobile router, and a peer node. The method comprises providing the mobile router with a delegation certificate that is cryptographically signed by or on behalf of the mobile node. At the mobile router, a mobility-related signalling exchange is initiated with the peer node on behalf of the mobile node, the mobile router providing to the peer node within this exchange, said delegation certificate or an identification of the certificate, and a sequence number associated with the certificate. At the peer node, the received sequence number is compared with a sequence number maintained by the peer node in respect of the delegation certificate, and the exchange authorized in dependence upon the result of the comparison.

19 Claims, 4 Drawing Sheets

(51) Int. Cl.
*H04L 29/06* (2006.01)
*H04W 12/10* (2009.01)

(56) References Cited

U.S. PATENT DOCUMENTS

2002/0106085 A1 8/2002 Jain et al.
2003/0084306 A1 5/2003 Abburi et al.

OTHER PUBLICATIONS

Devarapalli, et al: "Network Mobility (NEMO) Basic Support Protocol". Network Working Group. RFC: 3963. Jan. 2005.
Ernst, T.: "Network Mobility Support in IPv6". Oct. 2001. Doctoral Thesis.
Laganier, et al: "Host Identity Protocol (HIP) Rendezvous Extension". HIP Working Group, Internet-Draft. 2005.
Laganier, et al: "Host Identity Protocol (HIP) Registration Extension". Network Working Group, Internet-Draft. 2005.
Moskowitz, et al: "Host Identity Protocol Architecture draft-ietf-hip-arch-03". Network Working Group. Internet-Draft. Aug. 2005.
Moskowitz, et al: "Host Identity Protocol draft-ietf-hip-base-04". Network Working Group Internet-Draft. Oct. 2005.
Nikander: "Denial-of-Service, Address Ownership, and Early Authentication in the IPv6 World". Apr. 2001.
Nikander, et al: "A Bound End-to-End Tunnel (BEET) mode for ESP". Network Working Group. Internet-Draft. Nov. 2005.
Saltzer, et al: "End-to-End Arguments in System Design". Nov. 1984.
Wakikawa, et al: "ORC: Optimized Route Cache Management Protocol for Network Mobility". In Proc of the 10$^{th}$ International Conference on Telecommunications (ICT 2003). pp. 1194-2000. Feb. 2003.
Arkko, et al: "Quick NAP—Secure and Efficient Network Access Protocol". Dec. 2005.
Henderson, et al: End-Host-Mobility and Multihoming with the Host Identity Protocol, Internet Draft, work in progress, draft-ietf-hip-mm-13. Feb. 24, 2006.
Matos, et al.: "Host Identity Protocol Location Privacy Extensions draft-matos-hip-privacy-extensions-01", Mar. 6, 2006.
Nikander, et al.: Host Identity Protocol, Draft-ietf-hip-base-05. Mar. 2, 2006.
Nikander, et al: End-Host Mobility and Multi-homing with HIP, draft-ietf-hip-mm-04. Apr. 2008.
Blaze, et al: KeyNote Trust-Management System Version 2 RFC 2704. Informational standard, Sep. 1999.
Ellison, et al.: SPKI Certificate Theory. RFC 2693. Experimental Standard, Sep. 1998.
Madsen, et al.: "SAML Executive Overview" OASIS open Mar. 2005.
Nikander, et al.: "Delegation of signaling Rights". In Proc of the 10$^{th}$ International Workshop on Security Protocols, pp. 203-212; Cambridge UK Apr. 2002.
Ylitalo, et al.: "SPINAT: Integrating IPsec into Overlay Routing". In Proc of the First Internation Conference on Security and Privacy for Emerging Areas in Communications Networks (SecureComm'05). Athens, Greece, Sep. 2005.

DELEGATION BASED MOBILITY MANAGEMENT

CLAIM OF PRIORITY

This application is a continuation application of U.S. patent application Ser. No. 12/301,371, filed Jun. 30, 2009, now pending, which is a 371 of PCT/EP2006/062574 filed on May 24, 2006. The contents of these documents are hereby incorporated by reference herein.

FIELD OF THE INVENTION

The present invention relates to delegation based mobility management and in particular, though not necessarily, to such management in the context of a Host Identity Protocol addressing mechanism.

BACKGROUND TO THE INVENTION

User and terminal mobility is key to the success of current and future generations of cellular networks. Whilst mobility issues associated with conventional circuit-switched calls are essentially resolved, challenges remain in respect of provisioning IP-based data services. A number of mobility solutions for IP have been proposed. These include Mobile IP where a mobile node is allocated a permanent IP address within its home network, and registers a care-of-address with the home network when the mobile node is roaming.

Another solution to the IP mobility problem is to separate the identification and location functions from each other, and this is the approach taken in the Host Identity Protocol (HIP) proposal (R. Moskowitz, P. Nikander, P. Jokela, "Host Identity Protocol", Internet Draft, work in progress, draft-ietf-hip-base-05, IETF, 2006). HIP separates the location and identity roles of IP addresses by introducing a new name-space, the Host Identity (HI). In HIP, the Host Identity is basically a public cryptographic key of a public-private key-pair, and is generated from and linked to the private key. The public key identifies the party that holds the only copy of the private key. A host possessing the private key of the key-pair can directly prove that it "owns" the public key that is used to identify it in the network.

The HIP Host Identity (HI), being a public key, can be quite long and is therefore not practical in all situations. In HIP, the HI may be represented with a 128-bit long Host Identity Tag (HIT) that is generated from the HI by hashing it. Thus, the HIT identifies a HI. Since the HIT is 128 bits long, it can be used for IPv6 applications directly as it is exactly the same length as IPv6 addresses.

Figure 1:
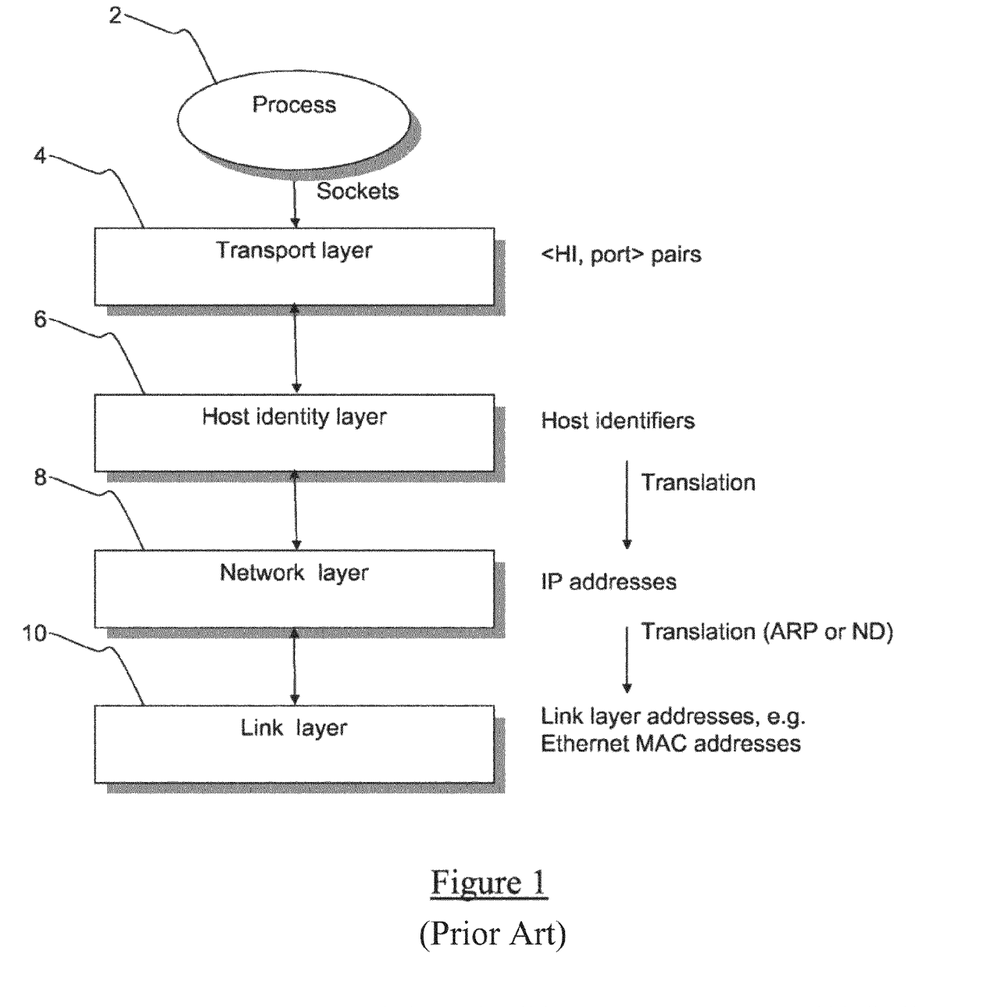
FIG. 1 (PRIOR ART) illustrates schematically the provision of a HIP layer within a communication protocol stack.

When HIP is used, the upper layers, including the applications, no longer see the IP address. Instead, they see the HI (or HIT) as the "address" of the destination host. The IP addresses no longer identify the nodes; they are only used for routing the packets in the network. The HIs (or HITs) which the applications use, must be mapped to the corresponding IP addresses before any packets leave a host. This is achieved in a new Host Identity Layer. FIG. 1 (PRIOR ART) of the accompanying drawings illustrates the various layers in HIP, comprising the standard transport layer 4, network layer 8 and link layer 10, with a process 2 communicating with the transport layer 4 below it. With HIP, a new Host Identity Layer 6 is disposed between the transport layer 4 and the network layer 8.

Figure 2:
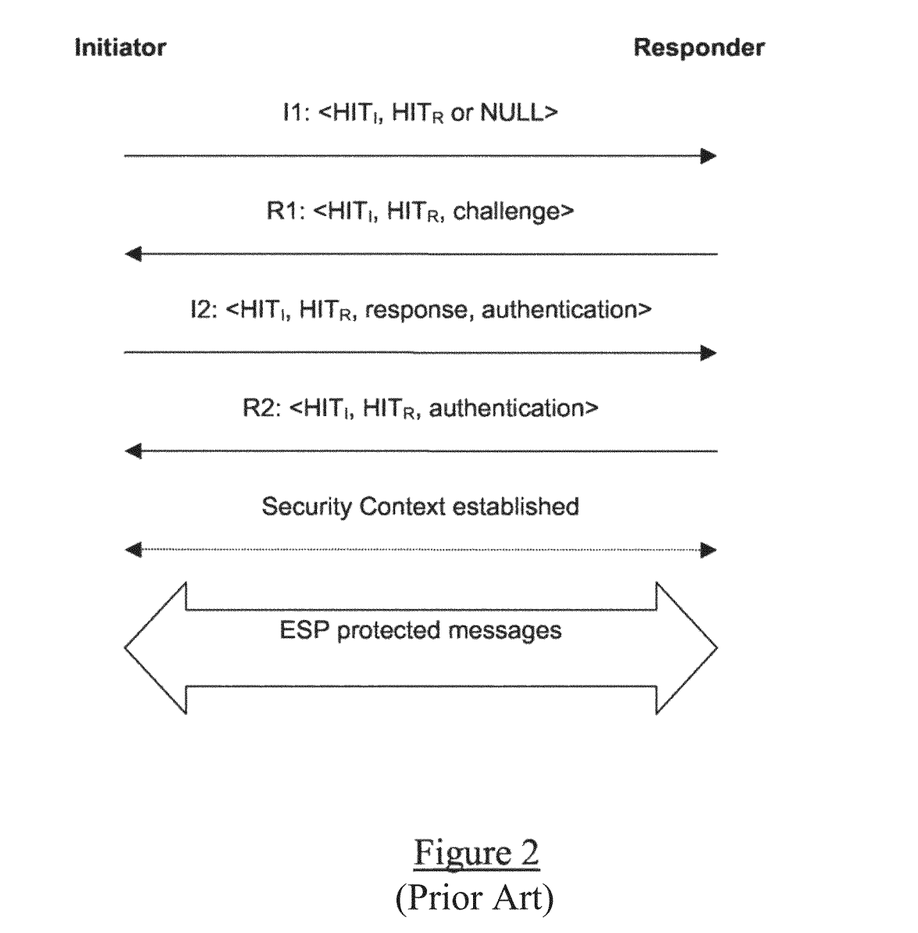
FIG. 2 (PRIOR ART) shows the HIP case exchange procedure.

FIG. 2 (PRIOR ART) of the accompanying drawings illustrates the operation of the four-way handshake base protocol of HIP. The negotiating parties are referred to as the Initiator, starting the connection, and the Responder. The Initiator begins the negotiation by sending an I1 packet that contains the HITs of the nodes participating in the negotiation. The destination HIT may also be zeroed, if the Responder's HIT is not known by the Initiator. When the Responder gets the I1 packet, it sends back an R1 packet that contains a puzzle to be solved by the Initiator. The protocol is designed so that the Initiator must do most of the calculation during the puzzle solving, and requires access to the private key corresponding to the HI. This gives some protection against DoS attacks. The R1 initiates also the Diffie-Hellman procedure, containing the public key of the Responder together with the Diffie-Hellman parameters. Once the R1 packet is received, the Initiator solves the puzzle and sends a response cookie in an I2 packet together with an IPsec SPI value and its encrypted public key to the Responder. The Responder verifies that the puzzle has been solved, authenticates the Initiator and creates the IPsec ESP SAs. The final R2 message contains the SPI value of the Responder.

The SAs established as a result of the HIP base-exchange are bound to the Host Identities, represented by the HITs. However, the packets travelling in the network do not contain the actual HI or HIT information. Rather, an arriving packet is identified and mapped to the correct SA using the Security Parameter Index (SPI) value in the IPsec header.

From the above it will be clear that changing the location information in the packet does not create any problems for the IPsec processing. The packet is still correctly identified using the SPI. If, for some reason, the packet is routed to a wrong destination, the receiver is not able to open the packet as it does not have the correct key.

When an outgoing packet arrives at the HI layer from the above layer, the destination HI or HIT is verified from the IPsec SADB. If an SA matching to the destination HI or HIT is found, the packet is encrypted using the session key associated with the SA. The HI or HIT is mapped to the correct destination IP address. At the receiving host, the SPI value is used to find the correct SA from the IPsec SADB. If an entry is found, the IP addresses can be changed to corresponding HITs and the packet can be decrypted using the session key.

A HIP Mobile Node (HMN) moving in the network may change the point of attachment to the Internet relatively frequently. When the connection point is changed, so is the IP address. This changed location information must be sent to the peer nodes, i.e. HIP Correspondent Nodes (HCN). The same address can also be sent to a Rendezvous Server (RVS) of the HMN, so that the HMN can be reached also via a more stable point. The HIP Mobility and Multi-homing protocol (P. Nikander, J. Arkko, P. Jokela, T. Henderson, "End-Host Mobility and Multihoming with Host Identity Protocol", Internet Draft, work in progress, draft-ietf-hip-mm-03, IETF, 2006) defines an update (UPDATE) packet that carries the LOCATOR parameter which contains the current IP address of the HMN. When the HMN changes location and IP address, it generates an UPDATE packet, signs the packet with the private key matching to the used HI, and sends the packet to the HCN and to the RVS.

When the HCN receives an UPDATE packet, it must start an address verification process for the IP address that is included in the UPDATE packet. The address verification is needed to avoid accepting false updates from the HMN. It sends an update acknowledgement (UPDATE-ACK) packet to the address that was in the UPDATE packet. When the HMN receives an UPDATE-ACK that matches the UPDATE sent earlier, it may start using the new IP address for sending data to HCN. After the HCN has received the first data packet from the new address, the address verification is completed and it can add the IP address as the location information of the HMN.

The HIP update exchange is also used for the purpose of rekeying. Rekeying is independent of location updates, as a mobile host may update its location without creating new IPsec security associations.

HIP UPDATE messages contain a HIP sequence number within the signed content. Synchronisation of sequence numbers is maintained by the HMN and the HCN at the respective HIP layers (a sequence number is maintained for each peer-to-peer HIP session). Each time the HMN sends an update message, the sequence number is incremented. An HCN will reject an UPDATE message if it does not contain the expected sequence number, e.g. if the sequence number has already been used. The use of sequence numbers in this way protects the peer node against so-called replay attacks (and a resulting denial-of-service).

HIP may be employed to handle mobility of mobile nodes that are attached to an access network that is itself mobile. Trains, busses, airplanes and Personal Area Networks (PANs) are examples of use cases where different moving network technologies can be applied. The moving network is a cluster consisting of mobile nodes (MNs) and one or more mobile routers (MRs). A mobile router connects the moving network to the Internet, and may change its point of attachment as it moves, i.e. a mobile router handoff. The mobile nodes in the moving network change their topological location together with the mobile router.

Within a moving network, each mobile router broadcasts "beacons" to advertise its existence. A single beacon contains the identity of a router operator. The mobile router may broadcast serially different kind of beacons, each of them including a different operator's identifier (e.g. where a single router is shared by several operators). The mobile node identifies the received beacon using a stored list of trusted operator identifiers. It allocates an IP address to itself and triggers an attachment exchange with the mobile router. The mobile node uses the HIP base protocol to register itself to the services offered by the mobile router. In this process, the mobile routers provides to the mobile node a pointer to the operator's authorisation certificate. This certificate authorises the mobile router to assign addresses, signal, and forward messages on behalf of the operator's clients. After validating the received certificate, the mobile node delegates forwarding and signalling rights to the mobile router.

The efficiency of a moving network can be significantly enhanced by allowing a mobile node to delegate to a mobile router the sending of location updates to peer nodes on behalf of the mobile node. A mobile node authorises a mobile router to send location updates by providing it with a further certificate signed with the HI of the mobile node. The lifetime of the certificate is the expected stay of the mobile node in the moving network. Each certificate issuer also keeps a list of the certificates that have a valid lifetime. When performing a location update on behalf of a mobile node, the mobile router sends the certificate to the peer node. This approach is described further in GB2381423. When a mobile node leaves a moving network, after movement it sends to peer nodes a list of certificate hashes for certificates that are no longer valid. Alternatively, a peer node may accept only certificates that are valid longer than the last received certificate. The latest certificate signed by the issuer revokes all the earlier signed certificates by the same issuer. In this way, the peer host only accepts messages with the latest timestamp. A modified approach is to store the certificate at some central location and to include in the update message sent by the mobile router a pointer to this location, the peer node then downloading the certificate from the central location.

Figure 3:
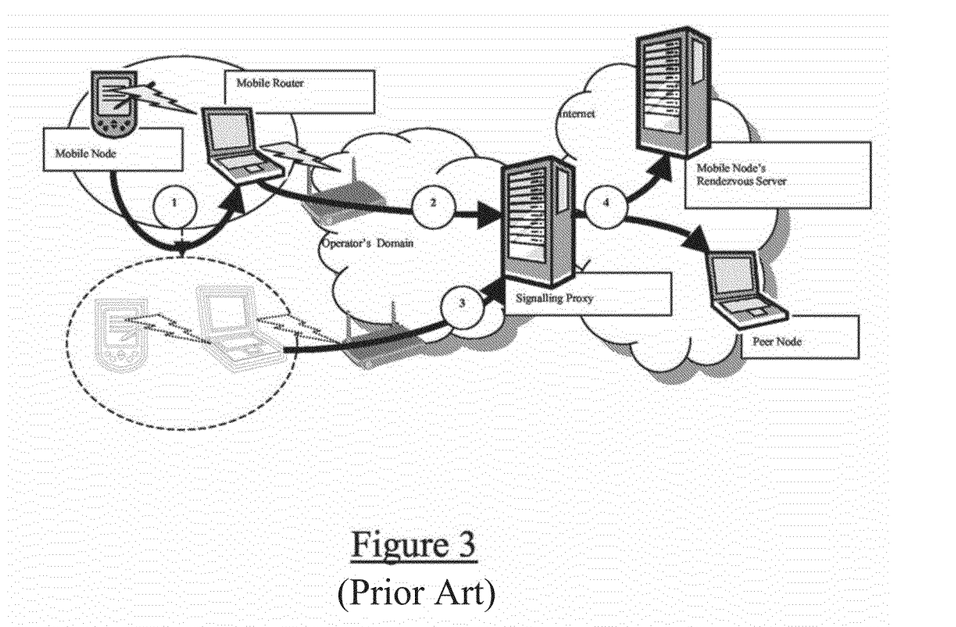
FIG. 3 (PRIOR ART) illustrates schematically a mobile node attached to a mobile router of a moving network.

FIG. 3 (PRIOR ART) illustrates schematically a mobile node attached to a moving network via a mobile router. The mobile node delegates the signalling rights to the mobile router at step (1). At step (2) the mobile router delegates the signaling rights further to the Signalling Proxy. At step (3), after a hand-off has been performed for the mobile router to a new internet access point of the operator's network, the mobile router runs a single update exchange with the proxy on behalf of the mobile node. At step (4), the proxy runs an update exchange with each peer node.

SUMMARY OF THE INVENTION

The HIP sequence number protection employed by the update exchange procedure causes difficulties for the moving networks where delegation of the process to the mobile router is employed. The problem is that when the mobile router sends an update request on behalf of a mobile node, the sequence number included in the request may be out of synchronisation with that maintained by the peer node. The peer node has to either reject the request, or proceed on the basis that the request cannot be verified, thus opening itself to a possible DoS attack. It will be appreciated that it is not sufficient to merely record the most recently seen sequence number at the mobile router, as this would not be the correct (most recently used) sequence number were the mobile node to have left and subsequently rejoined the moving network. Similarly, when a mobile node detaches from the mobile router, the sequence number maintained by the mobile node may not correspond to that maintained by a peer node, again resulting in the failure of subsequent update requests.

This problem will be further appreciated by the following scenarios.

Mobile Node Out of Synchronisation:
1. Initially a mobile node joins a moving network. It registers with a mobile router, and delegates the update signalling rights to the mobile router. The mobile node then runs the base-exchange procedure with a peer node.
2. The mobile router makes a hand-off (i.e. changes its point of attachment to the Internet), and runs an update exchange on behalf of the mobile node.
3. The mobile router and the peer node increase the sequence number counter for a first time.
4. Later, the mobile node leaves the moving network and attaches directly to the Internet. The mobile node runs an update exchange with the peer node.
5. The peer node ignores (drops) the update related packet as the sequence number it contains is too small, i.e. the mobile node and the peer node are out of synchrony, as the update exchange previously carried out between the mobile router and the peer node increased the sequence number.

Mobile Router Out of Synchronisation:
1. Initially a mobile node attaches to a moving network using its WLAN interface. It registers to a mobile router, and delegates the update signalling rights to the mobile router. Subsequently, the mobile node runs the base-exchange procedure with a peer node.
2. The multi-homed mobile node has also a GPRS interface. It runs an update exchange through the GPRS interface with the peer node. The mobile node and the peer node increase the sequence number for the first time.

3. Later, the mobile router makes a hand-off, and runs an update exchange on behalf of the mobile node with the peer node.
4. The peer node ignores (drops) the associated packet as the sequence number that it contains is too small, i.e. the mobile router and the peer node are out of synchrony.

According to a first aspect of the present invention there is provided a method of handling mobility-related signalling in a communications system comprising a mobile node, a mobile router, and a peer node, the method comprising:

providing the mobile router with a delegation certificate that is cryptographically signed by or on behalf of the mobile node;

at the mobile router, initiating a mobility-related signalling exchange with the peer node on behalf of the mobile node, the mobile router providing to the peer node within this exchange, said delegation certificate or an identification of the certificate, and a sequence number associated with the certificate; and at the peer node, comparing the received sequence number with a sequence number maintained by the peer node in respect of the delegation certificate, and authorising the exchange in dependence upon the result of the comparison.

Embodiments of the present invention tie the sequence number used to authenticate an exchange (and thereby prevent denial-of-service attacks) to the delegation certificate. When a different mobile router, or the mobile node itself, initiates a mobility-related signalling exchange, the peer node will authorise that exchange in dependence upon a sequence number associated with a different delegation certificate or with no certificate.

The invention is applicable in particular to the handling of Host Identity Protocol (HIP) mobility-related signalling. In this case, said mobility-related signalling exchange may be an update exchange, where said certificate or identification and sequence number is conveyed from the mobile router to the peer node in an UPDATE packet.

The communications system may comprise two or more chained mobile routers acting on behalf of the mobile node. The mobile router initiating a mobility-related signalling exchange with the peer node may be any one of the mobile routers in the chain.

In an embodiment of the present invention, the mobile router may provide to the peer node, within said exchange, a hash of the delegation certificate together with a pointer to the location of the certificate. The peer node maintains a library of previously received certificates, and compares the received hash against the hashes of the stored certificates to determine whether the certificate has been received previously. In the event that the certificate has not already been received, the peer node downloads the certificate from the identified location.

In a typical implementation of the present invention, the communications system comprises an IP network, for example the Internet. The mobile router provides a point of attachment for the mobile node to the Internet. The mobile router may implement a Network Address Translation function.

A system for implementing the invention according to the above first aspect comprises various means for implementing the stated functions.

According to a second aspect of the present invention there is provided a mobile router for use in a communications system and comprising:

means for receiving a delegation certificate that is cryptographically signed by or on behalf of the mobile node;

means for maintaining a sequence number counter associated with said certificate; and means for initiating a mobility-related signalling exchange with the peer node on behalf of the mobile node, and for providing to the peer node within this exchange, said delegation certificate or an identification of the certificate, and the sequence number held by said counter.

According to a third aspect of the present invention there is provided a client terminal for use in a communications system and comprising:

means for conducting a mobility-related signalling exchange with a mobile router acting node on behalf of a mobile node, said means receiving within this exchange, a delegation certificate or an identification of the certificate, and a sequence number associated with the certificate;

means for maintaining a sequence number counter associated with said certificate; and means for comparing the received sequence number with the sequence number held by the sequence number counter, and for authorising the exchange in dependence upon the result of the comparison.

According to a fourth aspect of the present invention there is provided a method of operating a mobile router within a communications system, the method comprising:

receiving a delegation certificate that is cryptographically signed by or on behalf of the mobile node;

maintaining a sequence number counter associated with said certificate; and initiating a mobility-related signalling exchange with the peer node on behalf of the mobile node, and providing to the peer node within this exchange, said delegation certificate or an identification of the certificate, and the sequence number held by said counter.

According to a fifth aspect of the present invention there is provided a method of operating a client terminal in a communications system, the method comprising:

conducting a mobility-related signalling exchange with a mobile router acting node on behalf of a mobile node including receiving within this exchange, a delegation certificate or an identification of the certificate, and a sequence number associated with the certificate;

maintaining a sequence number counter associated with said certificate; and comparing the received sequence number with the sequence number held by the sequence number counter, and authorising the exchange in dependence upon the result of the comparison.

DETAILED DESCRIPTION

The procedure described here aims to maintain all Host Identity Protocol (HIP) nodes participating in HIP update signalling, in synchrony, particularly in the case of a delegation based moving network architecture. The underlying idea is to create an association between the sequence number used by a mobile router of a moving network, and the delegation certificate provided to the mobile router by the mobile node.

The binding at the peer node side can be represented with the following formula: {Host Identity (HI) of the update sender, delegation certificate, sequence number of the update sender}. When the peer node receives an update message it makes the following pseudo-code comparison:

```
If (received_cert != stored_cert) {
     store(sender_hi,  received_cert, received_seq);
     send_response( );
} else If (received_cert == stored_cert && received_seq <
stored_seq) {
     Discard_packet( ); // reply
} else if (received_cert == stored_cert && received_seq ==
stored_seq) {
     resend_previous_response( );
} else {
     update(received_seq);
     send_response( );
}
```

As can be seen from this pseudo-code, the sequence number is reset whenever a new certificate is received from a mobile router. This happens for example when a mobile node has joined and left a moving network, and then rejoins the network.

Figure 4:
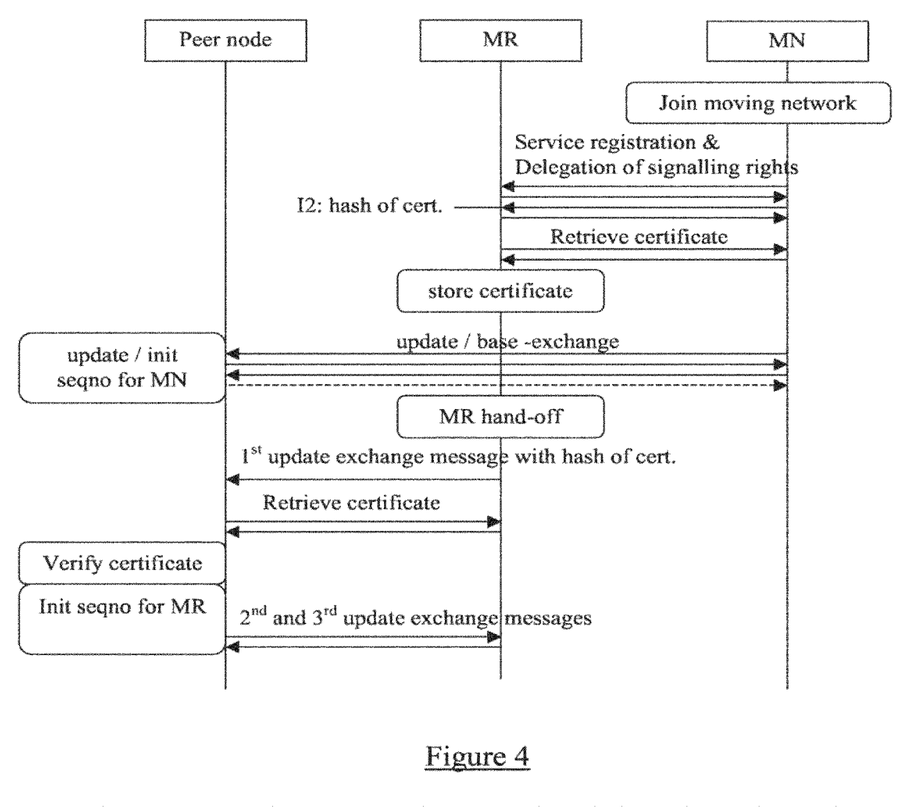
FIG. 4 illustrates a signalling procedure associated with the delegation of signalling to a mobile router and a subsequent update exchange.

FIG. 4 shows in detail the signalling process associated with the improved update procedure, where the step sequence is as follows:

1. The mobile node joins the moving network and discovers the mobile router.
2. The mobile node registers to the mobile router and delegates signalling rights to it. The mobile node generates a delegation certificate, and includes a hash of the certificate and the location of the certificate in the 12 message of the HIP base-exchange. This process involves the mobile node running the HIP base exchange with registration extensions (J. Laganier, T. Koponen, L. Eggert, "Host Identity Protocol (HIP) Registration Extension", Internet Draft, work in progress, draft-ietf-hip-registration-01, IETF, 2005). After the exchange mobile node has registered itself to the mobile router which is then able to signal on behalf of the MN.
3. The mobile router checks whether or not it already has the certificate, by comparing the received hash against hashes of previously received and stored certificates. In the event that the certificate is not held by the mobile router, it will retrieve it from the mobile node or central directory service. This approach reduces consumption of network resources.
4. If and when the mobile node initialises a connection with a peer node, it will run the HIP base-exchange process, unless the base-exchange has been run previously with the same peer node prior to joining the moving network. In the latter case, the mobile node will run the update exchange process with the peer node.
5. Once the peer node has created the context for the HIP session, it will initialise a first sequence number counter. Each subsequent update exchange initiated directly by the mobile node will increment that sequence number counter.
6. When the mobile router makes a hand-off, it will send an update message on behalf of the mobile node to the peer node in accordance with its delegated rights. The update message contains a hash of the certificate and the location of the certificate. The mobile router will initialise a new counter, a "second" counter, and include the sequence number of that counter in the update exchange.
7. The peer node retrieves the certificate, and verifies the authority of the mobile router to act on behalf of the mobile node using the HI of the mobile node.
8. The peer node initialises a second sequence number counter for the mobile router, synchronised with that maintained by the mobile router, and associated with the received delegation certificate.
9. The peer node completes the update exchange.
10. In a subsequent mobile router hand-off, the update message sent by the mobile router again contains a hash of the certificate and the location of the certificate, as well as the incremented (second) sequence number.
11. When the peer node receives the further update message, it must verify whether the sent hash of the certificate corresponds to the previously received certificate. If this is the case, the sequence number contained in the request will be compared against that held in the second counter associated with the certificate.
12. In the event that the mobile node reverts to sending an update request via a direct connection to the Internet, the sequence number included in the request will be that associated with the first counter. The peer node will associate the request with the first counter in the absence of a delegation certificate in the request.

It will be readily appreciated that several sequence counters will be running in parallel at the peer node in this scenario. A first counter is associated with updates sent directly from the mobile node, and each other counter is associated with a mobile router in possession of a delegation certificate. Each counter is bound to the lifetime of a certificate. The mobility problem is thereby solved.

The present invention may be employed where several nested moving networks are attached to each other, i.e. where there is a chain of mobile routers between the mobile node and the Internet. In this case, a mobile node will have allowed a first mobile router in the chain to delegate signalling rights to mobile routers further along the chain. This will typically involve the first mobile router generating a new certificate based on the original delegation certificate, but signed by the first mobile router, and passing this to the second mobile router, and so on. When a router in the chain initiates an update exchange for the first time, it will start its own counter, associated with the delegation certificate that it holds. The peer node may end up, for example, with a counter running for each router in the chain, as well as a counter for the mobile node itself (where the mobile node has a direct access to the Internet, e.g. via a GPRS interface).

It will be appreciated by the person of skill in the art that various modifications may be made to the above described embodiments without departing from the scope of the present invention.

The invention claimed is:

1. A method of handling mobility-related signaling in a communications system comprising a mobile node, a mobile router, and a peer node, the method comprising:
providing the mobile router with a delegation certificate that is cryptographically signed by or on behalf of the mobile node;
maintaining a first counter at the mobile router and incrementing the first counter for each mobility-related signaling exchange conducted by the mobile router with the peer node on behalf of the mobile node;
at the mobile router for each mobility-related signaling exchange initiated with the peer node on behalf of the mobile node, providing to the peer node within this exchange, said delegation certificate or an identification of the certificate and a sequence number associated with the certificate as defined by the current value of said first counter;

at the peer node, maintaining a second counter synchronized with said first counter maintained at the mobile router and, for each mobility-related signaling exchange conducted with the mobile router, comparing the received sequence number with a sequence number as defined by the current value of the second counter maintained by the peer node in respect of the delegation certificate, and authorizing the mobility-related signaling exchange in dependence upon the result of the comparison; and wherein the mobile router maintains the first counter which is dedicated to keeping track of a number of mobility-related signaling exchanges conducted by the mobile router with the peer node on behalf of the mobile node; and wherein the peer node maintains the second counter which is dedicated to keeping track of a number of mobility-related signaling exchanges conducted by the mobile router with the peer node on behalf of the mobile node.

2. The method according to claim 1, wherein said mobility-related signaling is Host Identity Protocol signaling.

3. The method according to claim 2, wherein said mobility-related signaling exchange is an update exchange where said certificate or identification and sequence number is conveyed from the mobile router to the peer node in an UPDATE packet.

4. The method according to claim 1, the communications system comprising two or more chained mobile routers acting on behalf of the mobile node, the mobile router initiating a mobility-related signaling exchange with the peer node being anyone of the mobile routers in the chain.

5. The method according to claim 1, wherein the mobile router provides to the peer node, within said exchange, a hash of the delegation certificate together with a pointer to the location of the certificate, the peer node maintaining a library of previously received certificates, comparing the received hash against the hashes of the stored certificates to determine whether the certificate has been received previously and, in the event that the certificate has not already been received, downloading the certificate from the identified location.

6. The method according to claim 1, the communications system comprising the Internet.

7. The method according to claim 6, the mobile router implementing a Network Address Translation function.

8. The method according to claim 1, wherein:

at the peer node, maintaining a third counter synchronized with a fourth counter maintained at the mobile node and, for each mobility-related signaling exchange initiated directly by the mobile node with the peer node, comparing a received sequence number with a sequence number as defined by a current value of the third counter maintained by the peer node with respect to a second delegation certificate associated with the mobile node, and authorizing the mobility-related signaling exchange in dependence upon the result of the comparison; and wherein the peer node maintains the third counter dedicated to keeping track of a number of mobility-related signaling exchanges initiated directly by the mobile node with the peer node.

9. The method according to claim 1, wherein the mobility-related signaling exchange is initiated when the mobile router changes its point of attachment to the communications system.

10. A mobile router in a communications system, the mobile router comprising:

a processor; and a memory that stores processor-executable instructions where the processor interfaces with the memory and executes the processor-executable instructions to perform operations as follows:

receiving a delegation certificate that is cryptographically signed by or on behalf of the mobile node;

maintaining a sequence number counter associated with said certificate and for incrementing the sequence number counter for each mobility-related signaling exchange conducted by the mobile router with a given peer node on behalf of the mobile node;

initiating a mobility-related signaling exchange with the peer node on behalf of the mobile node and for providing to the peer node within this exchange, said delegation certificate or an identification of the certificate and the sequence number currently held by said sequence number counter; and wherein the sequence number counter is dedicated to keeping track of a number of mobility-related signaling exchanges conducted by the mobile router with the given peer node on behalf of the mobile node.

11. The mobile router according to claim 10, wherein said mobility-related signaling exchange is an update exchange where said certificate or the identification of the certificate and the sequence number is conveyed to the peer node in an UPDATE packet.

12. A method of operating a mobile router within a communications system, the method comprising:

receiving, by the mobile router, a delegation certificate that is cryptographically signed by or on behalf of the mobile node;

maintaining, by the mobile router, a sequence number counter associated with said certificate and incrementing the sequence number counter for each mobility-related signaling exchange conducted by the mobile router with a peer node on behalf of the mobile node;

initiating, by the mobile router, a mobility-related signaling exchange with the peer node on behalf of the mobile node, and providing to the peer node within this exchange, said delegation certificate or an identification of the certificate, and the sequence number currently held by said sequence number counter; and wherein the sequence number counter is dedicated to keeping track of a number of mobility-related signaling exchanges conducted by the mobile router with the peer node on behalf of the mobile node.

13. The method according to claim 12, wherein said mobility-related signaling exchange is an update exchange where said certificate or the identification of the certificate and the sequence number is conveyed to the peer node in an UPDATE packet.

14. A peer node in a communications system, the peer node comprising:

a processor; and a memory that stores processor-executable instructions where the processor interfaces with the memory and executes the processor-executable instructions to perform operations as follows:

conducting a mobility-related signaling exchange with a mobile router acting on behalf of a mobile node, said means receiving within this exchange, a delegation certificate or an identification of the certificate and a sequence number associated with the certificate;

maintaining a sequence number counter associated with said certificate and for incrementing the sequence number counter for each mobility-related signaling exchange conducted with said mobile router acting on behalf of the mobile node; and comparing the received sequence number with the sequence number held by the sequence number counter, and for authorizing the mobility-related signaling exchange in dependence upon the result of the comparison; and wherein the sequence number counter is dedicated to keeping track of a number of mobility-related signaling exchanges conducted by the mobile router with the peer node on behalf of the mobile node.

15. The peer node according to claim 14, wherein said mobility-related signaling exchange is an update exchange where said certificate or the identification of the certificate and the sequence number is received at the peer node in an UPDATE packet.

16. The peer node according to claim 14, where the processor interfaces with the memory and executes the processor-executable instructions to perform following operations: maintaining a second sequence number counter synchronized with a third sequence number counter maintained at the mobile node and, for each mobility-related signaling exchange initiated directly by the mobile node with the peer node, comparing a received sequence number with a sequence number as defined by a current value of the second sequence number counter maintained by the peer node with respect to a second delegation certificate associated with the mobile node, and authorizing the mobility-related signaling exchange in dependence upon the result of the comparison, and wherein the peer node maintains the second sequence number counter dedicated to keeping track of a number of mobility-related signaling exchanges initiated directly by the mobile node with the peer node.

17. A method of operating a peer node in a communications system, the method comprising:

conducting, by the peer node, a mobility-related signaling exchange with a mobile router acting on behalf of a mobile node including receiving within this exchange a delegation certificate or an identification of the certificate, and a sequence number associated with the certificate;

maintaining, by the peer node, a sequence number counter associated with said certificate and incrementing the sequence number counter for each mobility-related signaling exchange conducted with said mobile router acting on behalf of the mobile node;

comparing, by the peer node, the received sequence number with the sequence number held by the sequence number counter, and authorizing, by the peer node, the mobility-related signaling exchange in dependence upon the result of the comparison; and wherein the sequence number counter is dedicated to keeping track of a number of mobility-related signaling exchanges conducted by the mobile router with the peer node on behalf of the mobile node.

18. The method according to claim 17, wherein said mobility-related signaling exchange is an update exchange where said certificate or the identification of the certificate and the sequence number is received at the peer node in an UPDATE packet.

19. The method according to claim 17, wherein:

at the peer node, maintaining a second sequence number counter synchronized with a third sequence number counter maintained at the mobile node and, for each mobility-related signaling exchange initiated directly by the mobile node with the peer node, comparing a received sequence number with a sequence number as defined by a current value of the second sequence number counter maintained by the peer node with respect to a second delegation certificate associated with the mobile node, and authorizing the mobility-related signaling exchange in dependence upon the result of the comparison; and wherein the peer node maintains the second sequence number counter dedicated to keeping track of a number of mobility-related signaling exchanges initiated directly by the mobile node with the peer node.

* * * * *